(12) United States Patent
Thompson et al.

(10) Patent No.: US 10,207,739 B2
(45) Date of Patent: Feb. 19, 2019

(54) DRIVEABLE VEHICLE UNIT

(71) Applicant: THOMSON LICENSING, Issy les Moulineaux (FR)

(72) Inventors: Alistair Thompson, London (GB); Ben Smith, Brooklyn, NY (US); Angus Kneale, New York, NY (US); Elia Popov, Valencia, CA (US)

(73) Assignee: Thomson Licensing, Issy le Moulineaux (FR)

( * ) Notice: Subject to any disclaimer, the term of this patent is extended or adjusted under 35 U.S.C. 154(b) by 297 days.

(21) Appl. No.: 15/129,821

(22) PCT Filed: Mar. 27, 2015

(86) PCT No.: PCT/GB2015/050949
§ 371 (c)(1),
(2) Date: Sep. 27, 2016

(87) PCT Pub. No.: WO2015/145180
PCT Pub. Date: Oct. 1, 2015

(65) Prior Publication Data
US 2017/0174263 A1    Jun. 22, 2017

(30) Foreign Application Priority Data

Mar. 27, 2014  (GB) .................................. 1405527.1

(51) Int. Cl.
*B62D 21/14*    (2006.01)
*B60Q 1/04*     (2006.01)
(Continued)

(52) U.S. Cl.
CPC .......... *B62D 21/14* (2013.01); *B60B 35/1045* (2013.01); *B60B 35/1063* (2013.01);
(Continued)

(58) Field of Classification Search
CPC ........ B62D 21/14; H04N 7/181; G06T 7/246; G06T 15/506; G06T 7/73;
(Continued)

(56) References Cited

U.S. PATENT DOCUMENTS

| 4,709,306 A | 11/1987 | Harris et al. |
| 2007/0098290 A1 | 5/2007 | Wells |

(Continued)

FOREIGN PATENT DOCUMENTS

| FR | 2844245 | 3/2004 |
| FR | 2990182 | 11/2013 |

*Primary Examiner* — Karen Beck
(74) *Attorney, Agent, or Firm* — Vincent E. Duffy

(57) ABSTRACT

A vehicle (100) for use in the field of visual effects is provided, which has at least one adjustable dimension. The vehicle comprises a frame (101) and a plurality of wheels (110, 120, 130, 140), the wheels being adjustably attached to the frame such that the distance between a pair of wheels can be adjusted either manually or automatically. This adjustment may be a continuous adjustment. The vehicle may also comprise tracking markers which generate data in order to facilitate the production of a digital model. The vehicle may also comprise a camera (155) having a 360 degree field of view. The data captured by the camera can be used in the digital effects process to create realistic reflections of the surrounding environment on the digital model.

12 Claims, 11 Drawing Sheets

(51) Int. Cl.
    *B62D 21/18* (2006.01)
    *B62D 23/00* (2006.01)
    *B60B 35/10* (2006.01)
    *B62D 49/06* (2006.01)
    *B60Q 1/00* (2006.01)
    *B60Q 1/08* (2006.01)
    *G06T 7/73* (2017.01)
    *G06T 7/246* (2017.01)
    *B60B 35/14* (2006.01)
    *B60Q 1/06* (2006.01)
    *B60Q 1/26* (2006.01)
    *G06T 15/50* (2011.01)
    *H04N 7/18* (2006.01)

(52) U.S. Cl.
    CPC ............ *B60B 35/14* (2013.01); *B60Q 1/0035* (2013.01); *B60Q 1/0483* (2013.01); *B60Q 1/06* (2013.01); *B60Q 1/08* (2013.01); *B60Q 1/2657* (2013.01); *B62D 21/18* (2013.01); *B62D 21/183* (2013.01); *B62D 23/005* (2013.01); *B62D 49/0657* (2013.01); *G06T 7/246* (2017.01); *G06T 7/73* (2017.01); *G06T 15/506* (2013.01); *H04N 7/181* (2013.01); *G06T 2207/10004* (2013.01); *G06T 2207/30204* (2013.01); *G06T 2207/30252* (2013.01); *G06T 2215/16* (2013.01)

(58) Field of Classification Search
    CPC . G06T 2207/30252; G06T 2207/30204; G06T 2215/16; B60Q 1/0035
    See application file for complete search history.

(56) References Cited

U.S. PATENT DOCUMENTS

| | | | |
|---|---|---|---|
| 2010/0164862 A1* | 7/2010 | Sullivan | G06K 9/3216 345/156 |
| 2010/0182398 A1 | 7/2010 | Mazzilli | |
| 2011/0204203 A1 | 8/2011 | Miller | |
| 2014/0008897 A1 | 1/2014 | Tsukerman et al. | |
| 2014/0316611 A1* | 10/2014 | Parente Da Silva | G06T 19/006 701/2 |
| 2015/0049193 A1* | 2/2015 | Gupta | G03B 43/00 348/148 |
| 2015/0098612 A1* | 4/2015 | Sato | G06K 9/00825 382/103 |
| 2017/0316253 A1* | 11/2017 | Phillips | G06T 7/0044 |
| 2017/0316573 A1* | 11/2017 | Vicenzotti | G06T 7/70 |
| 2018/0025632 A1* | 1/2018 | Breed | G01C 21/32 701/93 |
| 2018/0082135 A1* | 3/2018 | Crawford | B60R 11/04 |
| 2018/0122099 A1* | 5/2018 | Lee | H04N 5/217 |

* cited by examiner

DRIVEABLE VEHICLE UNIT

This application claims the benefit, under 35 U.S.C. § 365 of International Application of PCT/GB2015/050949, filed Mar. 27, 2015, which was published in accordance with PCT Article 21(2) on Oct. 1, 2015, in English, and which claims the benefit of Great Britian Application No. 1405527.1, filed Mar. 27, 2014.

FIELD

The invention relates to a vehicle and, in particular, one for use in the field of visual effects.

BACKGROUND

When it is desirable for a car to appear on screen, for example in a car advert or as part of a film, there are many considerations to be taken into account. For example, both time and money are required to transport a car to the location of filming. Even upon transportation of the car, requirements regarding the car specification can change at the last minute. For example, during the designing, development and manufacturing process, the bodywork design can change rapidly. This means that, to capture the full breadth of the campaign in a car advert, which are often filmed before the design is finalised, it would be necessary to film several cars of different models, specifications and colours. This would be expensive and time-consuming, and the availability of the car models is often extremely limited.

Digital effects can be used to alter certain aspects of a car's appearance in post-production, and this approach can at least partially alleviate certain problems detailed above. Constructing a digital model of an entire car using digital effects without a physical model upon which to base the effects is possible, but is time consuming and relatively expensive. Further, this method does not provide the director of the film or advert with a framing reference, and any desired interaction of the car with people or the environment must be similarly digitally created.

Motion tracking is a well-known and common visual effects technique, and involves tracking the movement of 'markers' which are placed on a physical model. The data generated by this tracking allow a digital model to be created. The produced data are representative of the movement of the trackers.

One approach used in the field of car advertising is to film a generic car using motion tracking techniques, then use digital effects to overlay this generic car with a digital model of a car which conforms to the required specifications. This approach allows for flexibility in post-production, and removes the need to transport the specific car model to the location of filming. However, there are problems with this approach, for example if the car has physical features which extend beyond the boundaries of the desired digital model—the CGI silhouette—then time must be spent removing these features from the digital model. Additionally, interactions with the environment may be difficult to create realistically.

The present invention seeks to address these problems by providing a relatively small vehicle having at least some dimensionally adjustable specifications.

SUMMARY

An invention is set out in the claims.

BRIEF DESCRIPTION OF THE DRAWINGS

A preferred embodiment of the invention will now be described in connection with the accompanying drawings, of which.

OVERVIEW

Figure 1:
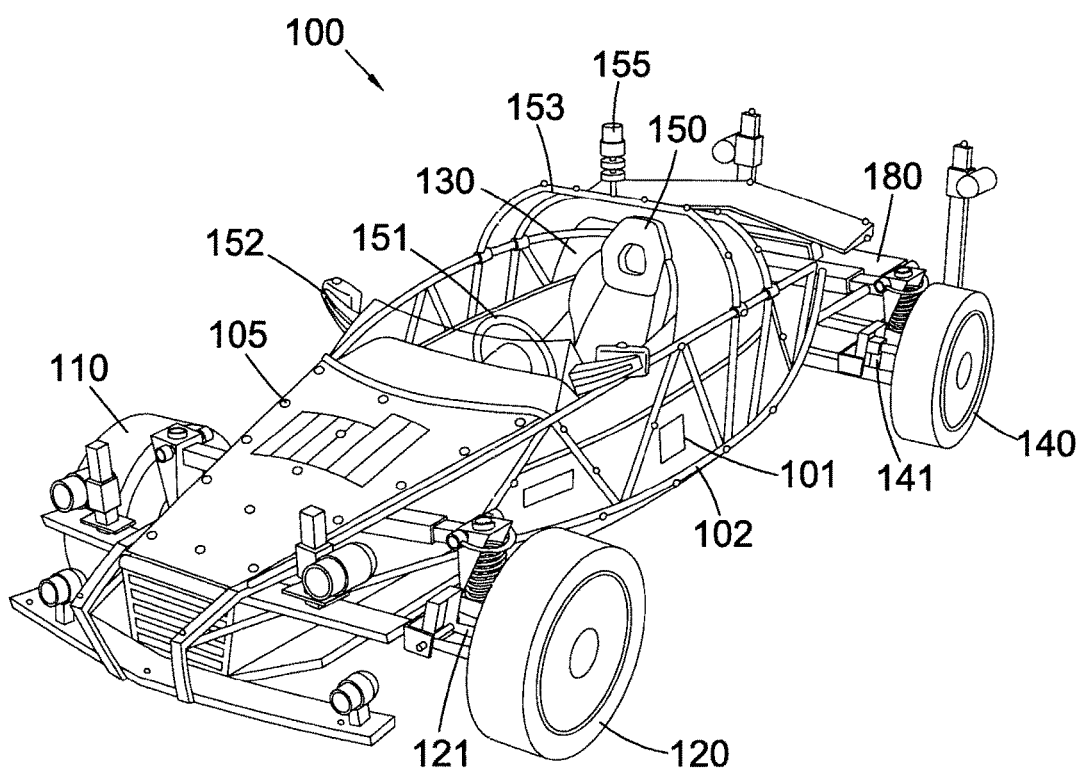
FIG. 1 depicts a front view of an example of a vehicle in accordance with an embodiment of the invention.

This disclosure relates generally to the application of motion tracking, and similar visual effects techniques, to the field of vehicles, and more specifically to car advertisements which use digital effects.

The axle track of a vehicle is the distance between the centerline of two wheels on the same axle. This is distinct from the wheelbase of a vehicle, which is the distance between the front and rear axles. In a vehicle with two axles such as the one described herein, it is hence possible to define a "front track" and a "rear track". It is possible to define two directions relating to axle track and wheelbase-transverse and longitudinal. Increasing a car's wheelbase is to generally increase the size of the vehicle in a longitudinal direction. Similarly, increasing the axle track or a vehicle is to generally increase the size of the vehicle in a transverse direction.

It is useful when building a digital model to use a physical vehicle which has the same wheelbase and axle track as the desired digital model. The invention relates to a vehicle with an automatically and continuously adjustable wheelbase and axle track which can be reconfigured to any car specification. In this way the vehicle can provide a platform or base upon which to place a digital model; the digital model can then conform to a variety of specifications. Such a vehicle provides a versatile and flexible visual effects tool, which allows data to be captured which are representative of any car. Further, the vehicle is smaller in profile than most standard vehicles, allowing a digital model, or CGI silhouette, to be easily "slotted" over the physical model during the digital effects process.

An addition to the vehicle, in some embodiments, is a camera system. The camera system is made up of a multiple camera array, and can capture high resolution panoramic HDRI images of the vehicle's environment. The field of view of the camera includes a 360° degree panorama, as well as in all planes above and around the vehicle. The data captured by the camera can be used in the digital effects process to create realistic reflections of the surrounding environment on the digital model. For example, if the physical vehicle passes a lamppost, a reflection of the lamppost should be visible in the panelling or windscreen of the digital model.

Accordingly, a vehicle is provided with adjustable specifications for use in the field of motion tracking, or more generally, visual effects. The vehicle has a frame or chassis which can comprise a plurality of trackers. In one embodiment, the vehicle has an engine and a drive axle at the front of the vehicle. The rear wheels are coupled to a non-drive axle, which is in turn coupled to a sub-section of the main frame which is attached to the main body of the vehicle via at least one extendable frame rail. The extension of the frame rail is accomplished via at least one linear actuator. The extension and retraction of the frame rail allows the rear wheels to be re-positioned relative to the front wheels, and this means the length of the vehicle can be adjusted.

In another embodiment, the frame has a number of drive controllers being controlled by a motor controller, the drive controllers each being attached to a respective wheel. For example, the vehicle may have four electric motors, one attached to each wheel. The vehicle's wheelbase is adjustable via a linear actuator, and the vehicle's axle track is adjustable via a number of linear actuators extending from each electric motor to the axle-wheel coupling. This means the axles have adjustable effective lengths. In this way the axle track of a pair of wheels can be adjusted. The front headlamps and rear lights can be similarly adjustably attached to the frame via linear actuators, as can other relevant points of reference.

In some embodiments, the vehicle further comprises a camera system which is configured to capture 360° panoramic data, including all planes above and around the vehicle. This data relates to the vehicle's environment.

In this manner, the distance between any two sets of wheels, and the relative position of the rear and front headlamps, can be adjusted relative to the frame via the use of linear actuators. This allows the technique of motion tracking to be applied to a physical model which can be physically reconfigured to produce motion tracking data representative of vehicles with a large variety of wheel bases, axle tracks, and headlamp positions.

DETAILED DESCRIPTION

Computer generated animation, also known as computer animation or CGI (computer generated imagery) animation, can comprise the technique of motion tracking. There are many techniques and technologies associated with motion tracking. The use of a physical model is common, the motion of the physical model being used to create digital data representative of the motion. The data then comprise a collection of points in a 2d or 3d space, and can be used to create a digital representation of the model using animation techniques.

This process may involve the use of trackers, the trackers being designed to use optical, magnetic, reflective, mechanical or inertial effects, or a combination of these, as understood by those skilled in the art. The trackers can be filmed and/or tracked by multiple cameras, and from multiple angles if necessary. The position of the trackers can be sampled at a rate which then defines the temporal resolution of the system. Methods of tracking the position of the trackers include triangulation. The advantage of using tracking markers is that a close correspondence between the motion of a physical model and a digital model can be achieved.

An example of a vehicle in accordance with the present invention is depicted in FIG. 1. FIG. 1 is a front view of the vehicle, 100. The vehicle comprises a frame 101 and four wheels 110, 120, 130 and 140. The wheels can be sub divided into the front wheels, 110, 120, and the back wheels, 130 and 140. In one embodiment, the frame comprises an assembly of metal poles rather than solid metal sheeting, to reduce the weight of the vehicle. The frame is designed to be aerodynamic, and as such has a cross sectional area which increases from a relatively small front cross section to a larger middle cross section, the cross section then again reducing toward the rear of the vehicle. The metal frame is fashioned to hold a lightweight inner shell 102, which houses the various components of the vehicle such as drive controllers, motor controllers and so forth, the details of which will be expanded upon herein. The composite structure of the strong outer frame 101 of metal poles and a lighter inner shell 102 has the effect of being light weight, whilst retaining the strength required to resist the strain typically put on vehicles in motion.

The front wheels 110, 120 are coupled to the frame 101 via axles, which are in turn connected to drive controllers. There can be a single axle per wheel, or a single axle which connects both front and both rear wheels. The wheels can have standard wheel hubs, which accommodate all standard wheel lug patterns. The frame can be fashioned from any suitable material, for example a metal, rigid plastic or fibre-reinforced polymer such as carbon-fibre, and similarly the wheels can be standard tyres fashioned using any suitable material such as rubber or a suitable plastic, as known to those skilled in the art.

A large number of LED tracking markers 105 are attached to the vehicle. These are used for the purpose of motion tracking, as understood by those skilled in the art. The relative position of the trackers changes when the wheelbase and axle track of the vehicle are adjusted as detailed below, allowing data to be captured which represent a variety of vehicle specifications. This process of creating a digital model can be done in real-time or in post-production, as understood by those skilled in the art.

The vehicle 100 contains several features common to conventional vehicles, such as a seat 150 for a driver, side/wing mirrors 152, a steering wheel 151 to control the steering of the vehicle, and so forth. The vehicle 100 may comprise other features, such as a spoiler, windscreen and a roll-over protection structure 153, the latter to protect a driver against the possibility of injury during vehicle overturns and roll-overs. Whilst the vehicle 100 is shown with a seat for a driver, this disclosure does not preclude the use of a remote controlled vehicle. The implementation of the vehicle described herein as a remote controlled vehicle (RCV) would allow deployment of the vehicle when the use of a driver would not be advisable, for example when filming a dangerous stunt.

In some embodiments, the vehicle further comprises a camera system, 155. The camera system consists of a multiple camera array, and is configured to capture HDRI data. The camera system is positioned above the vehicle. This allows the camera system to have a field of view that encompasses not just a horizontal 360° view of the environment, but all planes above and around the vehicle. The resulting field of view could be described as near spherical, with only the portion of the sphere corresponding to the vehicle itself not being included in the camera array's view. Dynamic range describes a camera's ability to capture differing luminosity levels. Typically, the dynamic range of sensors used in digital photography is many times less than that of the human eye. HDRI provides a greater dynamic range than typical digital photography techniques, and is known to those skilled in the art.

The system uses multiple cameras to record high frame rate and high resolution video, allowing the use of stitching software or a stitching algorithm of any conventional type to produce full 360° footage. This footage can be used to create realistic reflections on the digital model.

First Embodiment

In one embodiment, the vehicle is a front wheel drive vehicle, and the rear wheel axle is coupled to a sub-section of the main frame in such a way that it can be extended. This extendable coupling allows the distance between the front and rear axle, i.e. the wheelbase of the vehicle, to be extended and retracted.

Coupled to the main frame 101 is a sub-section of the frame, which takes the form of an extendable plate or shelf 180. This extendable plate is configured to extend from the main frame of the vehicle. This can be accomplished using linear actuators. The shelf sits on two metal bars, or frame rails, each of which can be extended or retracted via a respective linear actuator. The rear wheels are coupled to an axle, which is in turn coupled to the extendable shelf. As will be appreciated, the wheelbase of the car can be adjusted via the use of the linear actuators.

The vehicle has a front wheel drive design. The engine is a gas engine; the power and transmission is provided to the front wheels via methods and apparatus known to those skilled in the art. The front axle is a drive axle, as it is powered by the engine. The rear axle is a non-drive, dead or lazy axle, as its wheels are independent and freely rotating. This means there need be no front-rear differential system, and hence complicated alterations to the front-rear differential of the vehicle as the wheelbase is adjusted are avoided. The differential between the two front wheels is arranged in any number of ways, and can be managed using conventional technology as will be appreciated by those skilled in the art.

Figure 2:
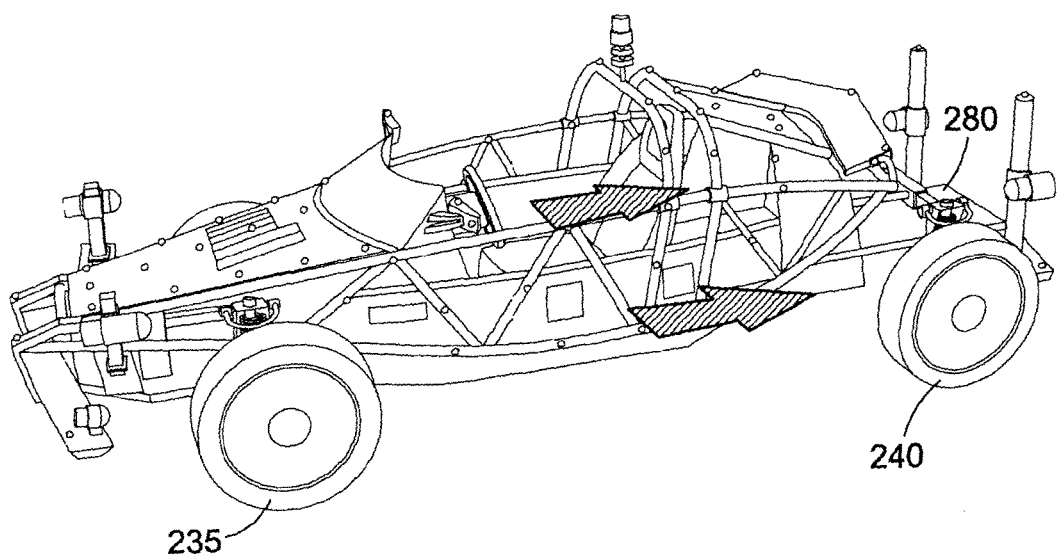
FIG. 2 depicts a view from the side of the vehicle, where the frame is shown to be adjustable.

When a user wishes to increase the effective length of the car by increasing its wheelbase, he can simply provide power to the linear actuators and cause them to extend. This causes the rear axle, and hence the rear wheels, to extend relative to the mainframe, 101. This is shown in FIG. 2, where the action of the linear actuators is shown schematically by the arrows. This extension can be done via the use of a button, switch or other suitable control method. In this way, the wheelbase is easily expanded and retracted by an entirely automated method.

The resulting vehicle has a wheelbase which is easily adjustable. The process is automated, meaning the wheelbase can be altered quickly, efficiently and with minimal effort. In this way the vehicle can act as a physical model for a variety of different car models. Many car manufacturers produce car ranges with very similar axle track specifications, and so an adjustable wheelbase allows the vehicle to act as a physical model for the full range of body compositions, for example the 'hatch-back', 'station wagon' and 'sedan' models of a particular manufacturer's range.

Placing the engine in the front of the vehicle and adjusting the placement of the rear axle in relation to the engine means that the majority of automotive components which are mechanically coupled to the engine, such as the components which comprise the transmission and vehicle differentials, remain stationary at the front of the vehicle as the wheelbase is adjusted. This provides a simple method of adjusting the wheelbase. The relative simplicity of the method means that fewer mechanical parts are likely to malfunction or break.

It will be appreciated that the extendable plate 180 can be coupled to the main frame through a variety of means, and any number of linear actuators can be used to achieve the desired functionality. It would also be possible to provide the same functionality via a manually adjustable frame rail. It is also possible that the feature of an extendable shelf or frame rail is accomplished via telescoping components. In this embodiment, as the extendable frame rail is retracted from an extended position, there are components which encompass the retracting frame rail such that the retracting frame rail becomes very compact. This would have the effect of saving space on the vehicle.

The skilled person will further appreciate that the adjustable vehicle, i.e. a vehicle having an adjustable wheelbase via the use of a drive axle, a non-drive axle, and a number of linear actuators which are arranged to alter the distance between the two, can also be realised in a rear engine and rear-wheel drive design. This design would have an engine placed at the rear of the vehicle, with linear actuators arranged to extend or retract a shelf or sub-section of the main frame to which the front wheels are coupled. In this scenario, the rear axle becomes the drive axle, and the front axle becomes the non-drive axle. This would achieve a similar functionality as the vehicle described above, and this rear engine design is considered to be within the scope of this disclosure. With the above core concept in mind, it will be appreciated that the shelf or plate 180 is not an essential component of the vehicle. A number of designs are possible whereby a frame has a sub-section which is extendably attached to the main frame, the extendable sub-section being coupled to the main frame via linear actuators and being further coupled to the rear wheels in order to provide an adjustable wheel base.

It should also be clear that the engine need not be a gas engine, but can be any type of engine which is configured to provide drive to the drive axle, for example a diesel engine or an electric motor.

Second Embodiment

In the second embodiment, both the wheelbase and axle track of the vehicle can be adjusted. The rear wheels 140 and 145 are coupled to a sub-section of the frame which is extendably attached to the main frame, as detailed above with regard to the first embodiment. This sub-section of the frame can be an extendable plate 180. In the second embodiment, each wheel is coupled to the frame via a respective drive controller. The drive controllers are arranged to impart power to the wheels, allowing the wheels to be powered individually and the vehicle to be driven. The drive controllers coupled to the front wheels are fixedly attached to the main frame, and the drive controllers coupled to the rear wheels are fixedly attached to the extendable plate. The sliding nature of the plate 180 with respect to the main frame means that the distance between the front and rear wheels, also known as the wheelbase, can be adjusted, as in the first embodiment.

Each wheel is coupled to a respective axle, which is in turn coupled to a drive controller. The linear actuators are arranged to adjust both the distance between any of the front wheels and the frame 101, and any of the rear wheels and the extendable plate. Extending the four linear actuators has the effect of increasing each axle's effective length, and hence the axle track of the vehicle is increased. Thus, when the user wishes to adjust the effective width of the vehicle, he must simply provide power to the linear actuators coupled to each wheel. As detailed above, this can be done via a switch or button, such that the process for both wheel base and axle track adjustment is entirely automated.

The drive controllers take the form of electric motors, these being controllable to drive the wheels. The electric motors are electrically coupled to a central motor controller such as a processing unit or control box. The vehicle contains a steering system designed to allow the user to use a steering wheel or the like to direct the vehicle. In an embodiment, the steering system also contains a sensor, which is electrically coupled to the control box. This sensor provides information about the angle that the steering wheel is turned to, as well as information about the speed at which the wheel is turned.

The vehicle has many standard vehicle features, such as a gas (accelerator) pedal and a brake pedal. Depending on the nature of the transmission, there may also be a clutch pedal. However, each of these pedals contains a sensor which measures the amount and rate of depression of the pedal. This information is communicated to the control box.

The control box, which may also be named a motor controller or processing unit, utilises the input from the pedals, steering system, wheels, and any other available data, and uses a series of control algorithms to determine how much power to deploy to each wheel. In this way, the control box can intelligently assess the power to impart to each wheel based on information from the steering system, pedals and wheels.

For example, whilst the vehicle is in motion, the motors are synchronised and cause the wheels to rotate at the same speed when the vehicle is travelling in a straight line. When the driver wishes to turn left, he turns the steering wheel. Accordingly, the sensor within the steering system communicates the 'amount' of turn, as well as the speed of the turn, to the control box. Hence, not only do the wheels change the direction in which they are pointing in accordance with a normal car steering system, but the information relayed to the control box also allows the power to be distributed between the drive controllers accordingly. In this case, the wheels on the left of the car travel a shorter distance—as they are on the inside of the curve—and the motor controller ensures that this change of distance is reflected in the power relayed to the inside wheels relative to the outside wheels. In this way the sensors and control box are an intelligent arrangement for providing the vehicle with a differential system.

Figure 9:
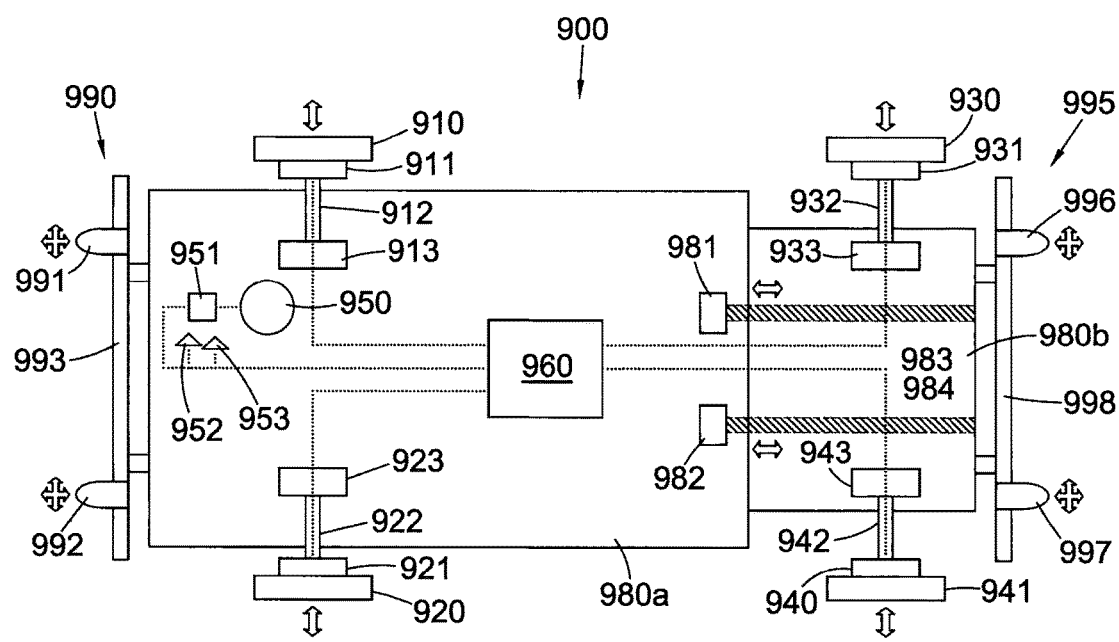
FIG. 9 depicts a schematic diagram of a vehicle in accordance with an embodiment of the invention.

A schematic of the second embodiment is shown in FIG. 9. It should be noted that there is no correspondence between reference numerals between Figures. In FIG. 9 the vehicle 900 is shown to have two front wheels 910, 920 and two rear wheels 930, 940, each of which is coupled to a respective axle 912, 922, 932 and 942. The wheels are powered by their respective drive controllers 911, 921, 931 and 941. The linear actuators 913 and 923 are fixedly attached to the vehicle's frame, and act to increase or decrease the effective length of their respective axles 912 and 922. This can be done, for example, by extending and retracting a metal bar, such as in a simple travelling nut linear actuator. Other means of extending/retracting can be adopted, for example using telescoping parts.

A similar functionality is provided to the rear wheels 930 and 940 by linear actuators 933 943 and extending and retracting axles 932 and 942. Here, the actuators and axles are coupled to an extendable shelf 980b. This extendable shelf 980b is supported by two extendable frame rails 983 and 984. Two linear actuators 981 and 982 are mechanically coupled to the vehicle's main frame 980a to control the extension of the extendable shelf 980b. Again, the actuators can take any appropriate form.

It is clear then that linear actuators 981 and 982 act to adjust the distance between the front wheels 910 920 and the rear wheels 930 and 940 respectively, and hence adjust the wheelbase of the vehicle.

Linear actuators 913 923 933 and 943 act to extend and retract the axles 911 921 931 and 941 respectively, and hence adjust the front and rear axle track of the vehicle. This is shown schematically in FIG. 3.

Each drive controller is communicatively coupled to control box 960. In the diagram, communicative couplings are shown with dashed lines. Further communicatively coupled to the control box are the gas and brake pedals 952, 953, and the steering wheel 950, via various sensors, such as steering wheel sensor 951. Here, communicative coupling simply means that the components can relay data to the control box 960, either via the use of wires or wirelessly. For example, the steering wheel sensor 951 provides data regarding the speed at which the steering wheel is turned, and to what angle, which allows the control box to assess how much power/torque to impart to the wheels. This intelligent system means that the vehicle can be front wheel drive, rear wheel drive, or all-wheel (four-wheel) drive, depending on the demands placed on the vehicle, or the desire of the driver. This has the effect of increasing vehicle versatility.

It will be appreciated that the array of sensors which feed data to the control box can be different according to the specific car specifications. The sensors can be any type of sensor, such as accelerometers, Hall Effect sensors, throttle position sensors, vehicle speed sensors, wheel speed sensors, torque sensors and the like.

It is also envisioned that the drive controllers 911 921 931 941 provide a regenerative braking system. If the drive controllers are electric motors, they can effectively be used as generators upon braking. In such a regenerative system, upon braking of the vehicle, the motors convert kinetic energy into another form, and hence the system acts to slow the vehicle down whilst storing useful energy. This converted energy can, for example, be stored in a battery, and hence kinetic energy which would otherwise be wasted upon braking can be stored for later powering of the vehicle.

The front headlamp arrangement 990 comprises at least two headlamps 991 and 992. These connect to linear actuators, allowing the headlamps to be moved in all dimensions as will be discussed later. The movement of the headlamps is depicted via a four-pointed arrow, though it should be noted that they can also move in a direction perpendicular to the plane of the diagram, i.e. into and out of the diagram. The rear light arrangement 995 has a similar arrangement.

FIG. 2 shows a side view of the vehicle, as a plate 180 is slid from under the frame to an extended position. As will be appreciated, the distance between the front and rear set of wheels is increased. This distance can be adjusted until the vehicle has the desired wheel base, at which point the linear actuator is stopped, and the plate is hence locked into position.

Figure 3A:
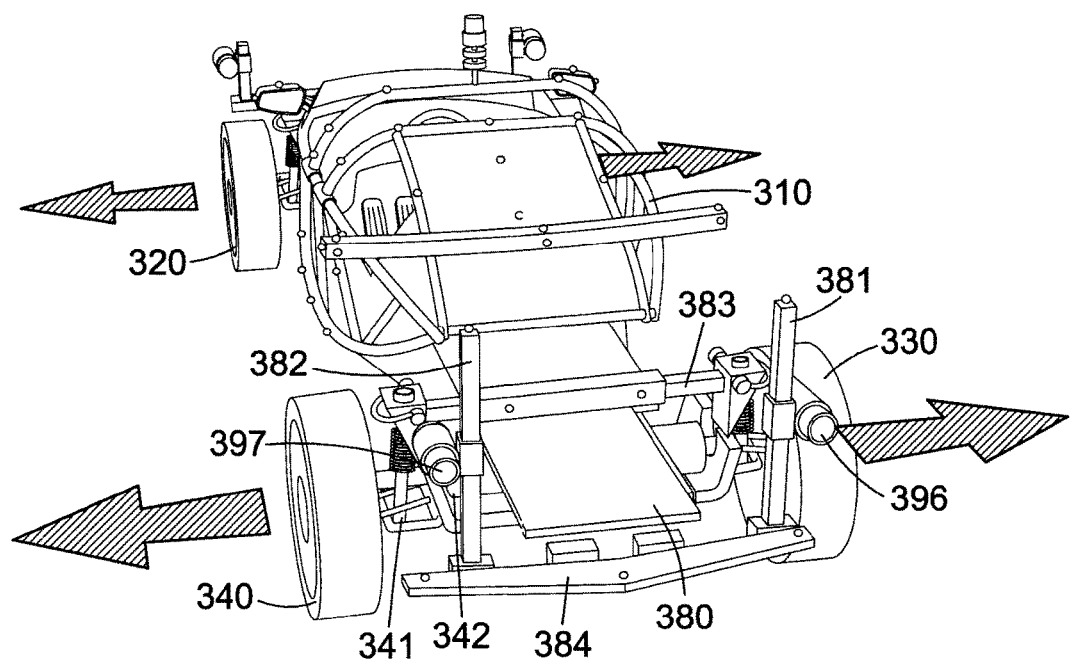
FIG. 3a depicts the view from the back of the vehicle, where the axle track of the vehicle is shown to be adjustable.

FIG. 3a likewise depicts increasing the axle track of the vehicle.

Figure 3B:
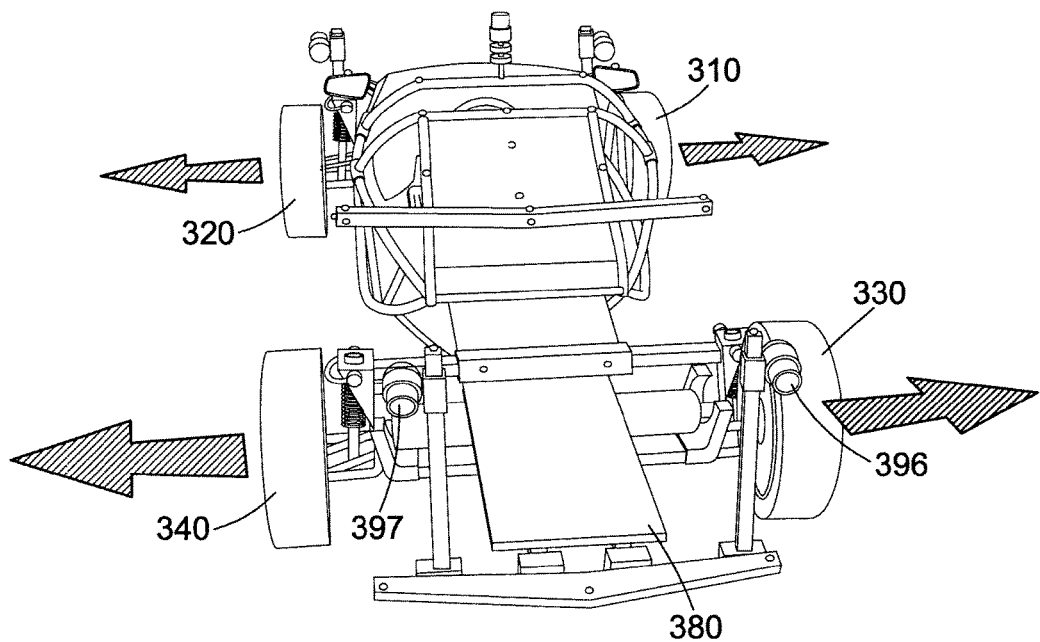
FIG. 3b depicts the view from the back of the vehicle, where the axle track of the vehicle is shown to be adjustable.

FIGS. 3a and 3b show the same rear view of the vehicle, with the relative position of the rear lights adjusted between each figure with respect to the frame, 101 and the rear wheels, 330 and 340. This relative movement of the headlamps can be achieved via the use of linear actuators and/or linear belt drivers. In general it is desirable to be able to move the relative positions of the headlamps in all directions. These directions include upwards and downwards, inwards and outwards in a direction substantially parallel to the rear axle and shown by the arrow in FIGS. 3a and 3b, and closer to and further away from the rear set of wheels, i.e. in a direction shown by the arrow in FIG. 2.

In the shown embodiment, a plate 380 is extendably coupled to the frame, by means substantially similar to the extendable plate described earlier. Coupled to this extendable plate are two horizontal bars 383 and 384. In one embodiment, these bars are fixed to and hence move with the extendable plate 380. Two vertical bars 381 and 382 are slideably coupled to the horizontal bars, and the headlamps 396 and 398 are slideably coupled to the vertical bars. This combination of extendable and slideable attachments allows the headlamps to be positioned according to a variety of vehicle specifications. A similar adjustable system is in place for the front headlamps.

Again, the system is designed to be entirely automated, such that the headlamp specification is configurable at the touch of a button or switch. The adjustable nature of the headlamps is useful in the field of digital effects. Adjusting the position of the head lamps allows a camera system to capture reflections and shadows from the headlamps which are useful during computer animation, and which are representative of the desired car specification's headlamp arrangement.

Figure 4:
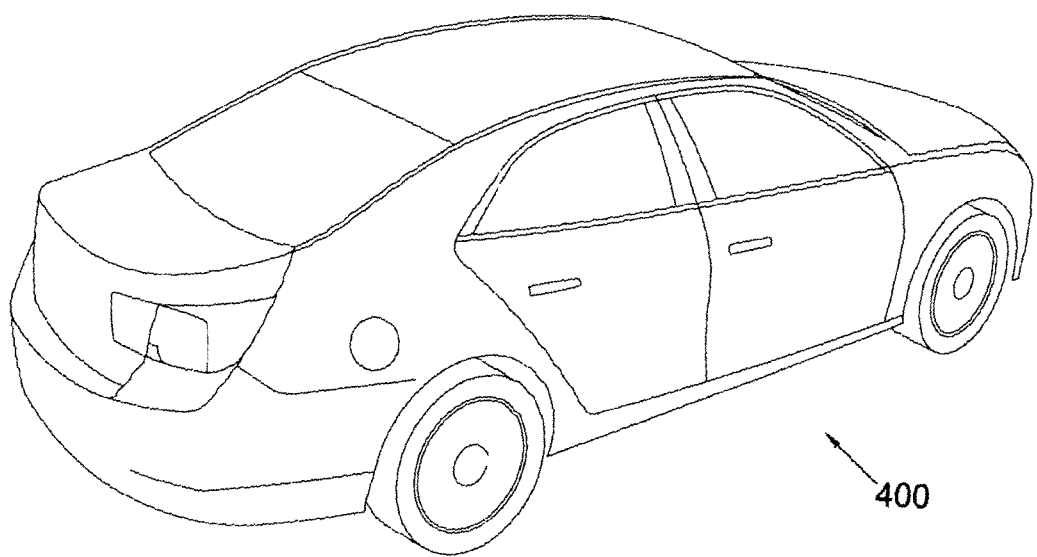
FIG. 4 depicts a view from the side of an example of a model car following a computer generated imagery process, produced using a vehicle in accordance with an embodiment of the invention.

FIG. 4 shows an example digital model of the vehicle which can be produced from the lengthened axle track and wheelbase. As will be appreciated, the body of the superimposed digital model is larger than the vehicle 100. The vehicle 100 is smaller than most standard or conventional vehicles. This means that during the digital effects process the vehicle can be easily overlaid by the CGI silhouette, i.e. the digital model. The adjustable nature of the wheelbase and axle track, as detailed above, along with the vehicle's small size, means that the vehicle can provide a useful base or platform on which to base a digital model of any car specification. When placing a CGI model of a car over a physical car during the computer animation process, any feature which is larger than the model will 'stick out' from the digitally imposed model or be otherwise visible. This feature then needs to be removed from the shot. This process is time consuming. Because the vehicle is smaller than most conventional vehicles, it is not necessary to remove any physical features in the digital effects process when superimposing a digital model.

Figure 5:
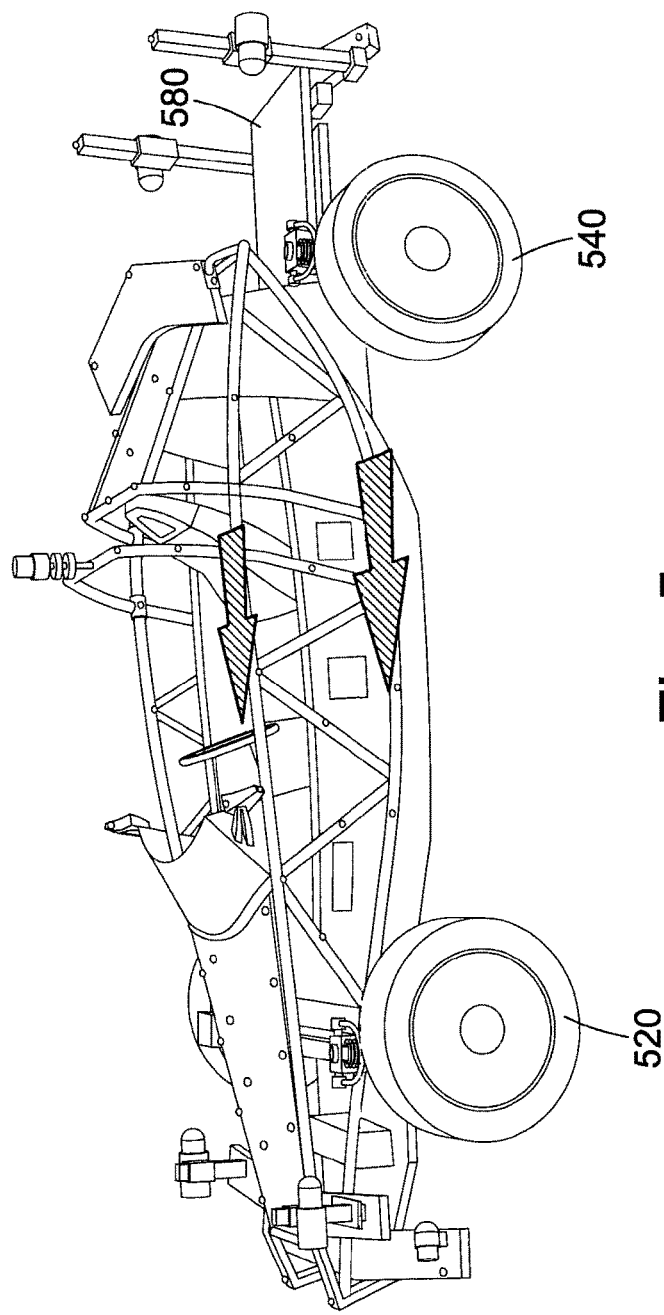
FIG. 5 depicts a view from the side of the vehicle, where the frame is shown to be adjustable.
Figure 6:
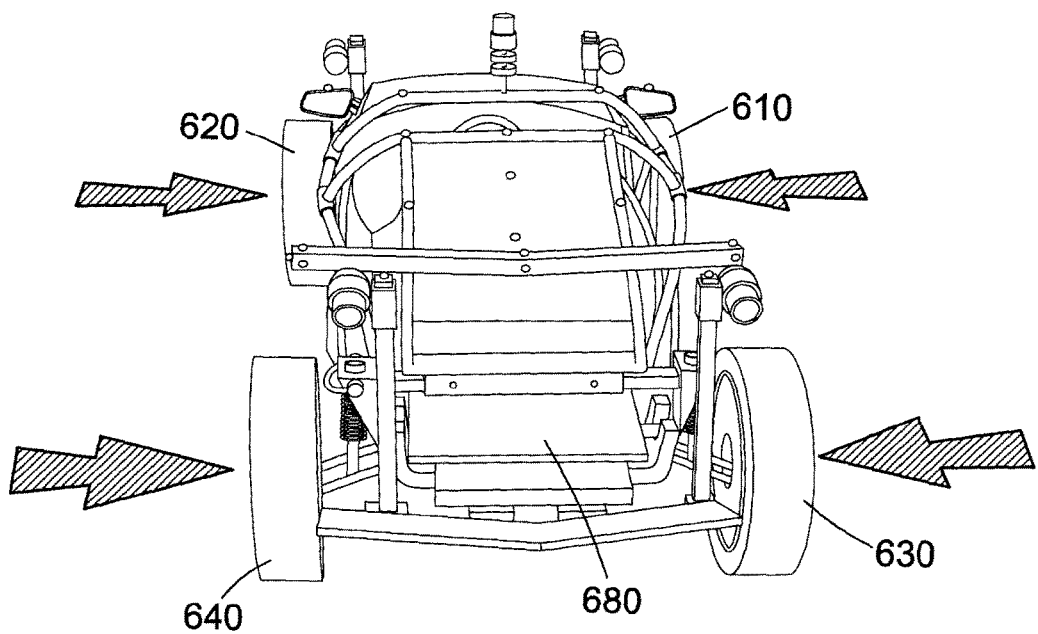
FIG. 6 depicts a view from the back of the vehicle, where the wheel-base is shown to be adjustable.
Figure 7:
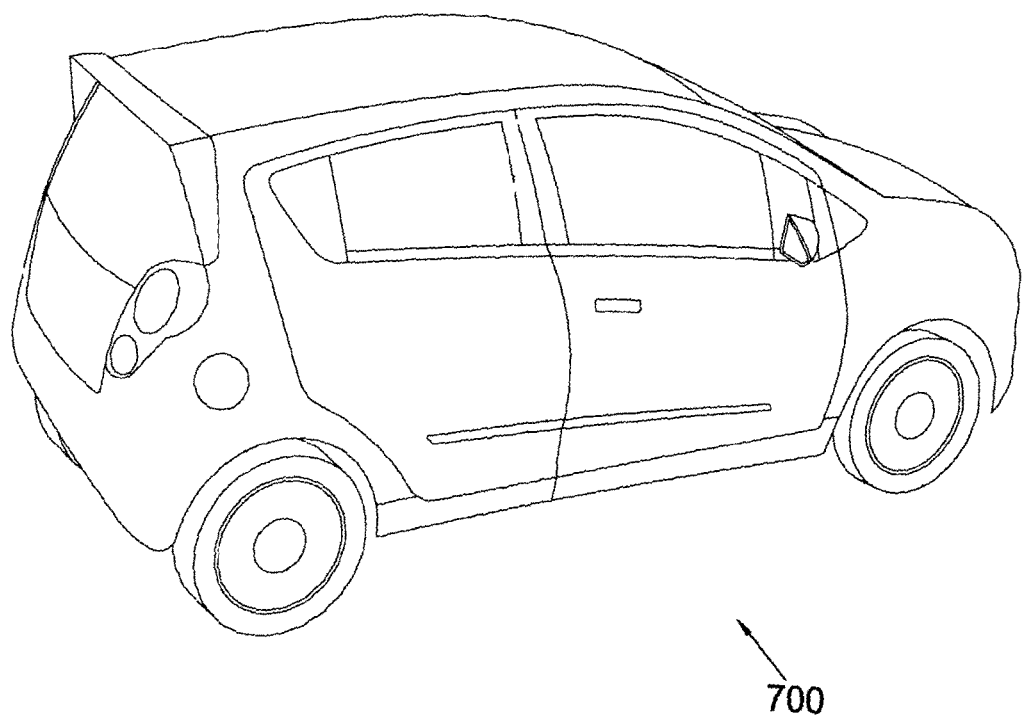
FIG. 7 depicts a view from the side of an example of a model car following a computer generated imagery process, produced using a vehicle in accordance with an embodiment of the invention.

FIGS. 5 and 6 depict the user reducing the wheel base and axle track, resulting in a shortened model of the same car design in FIG. 7.

Figure 8A:
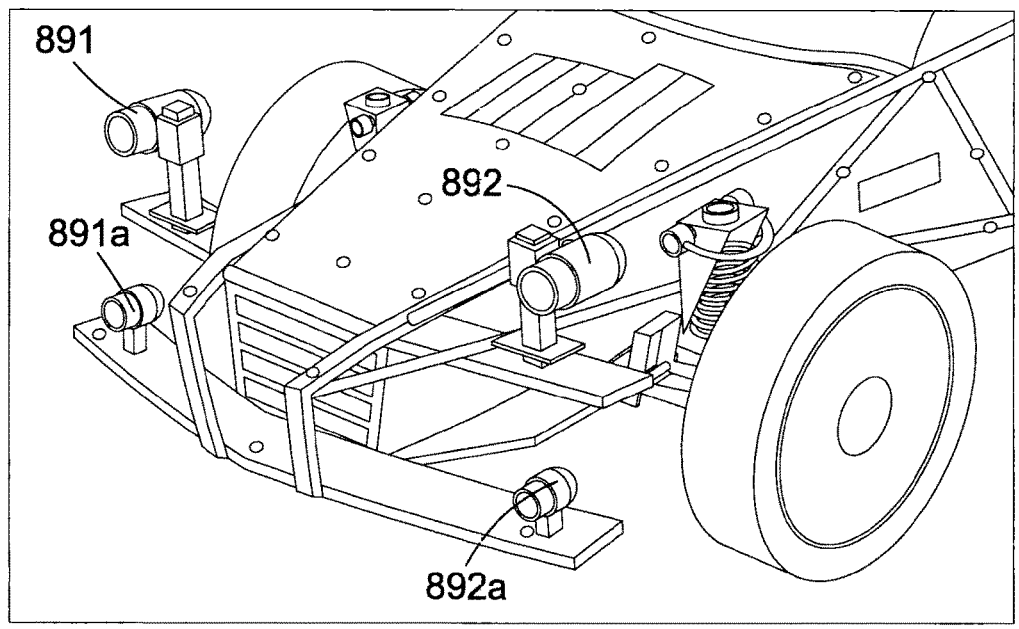
FIG. 8a depicts the front and headlamp attachment arrangement of the vehicle.
Figure 8B:
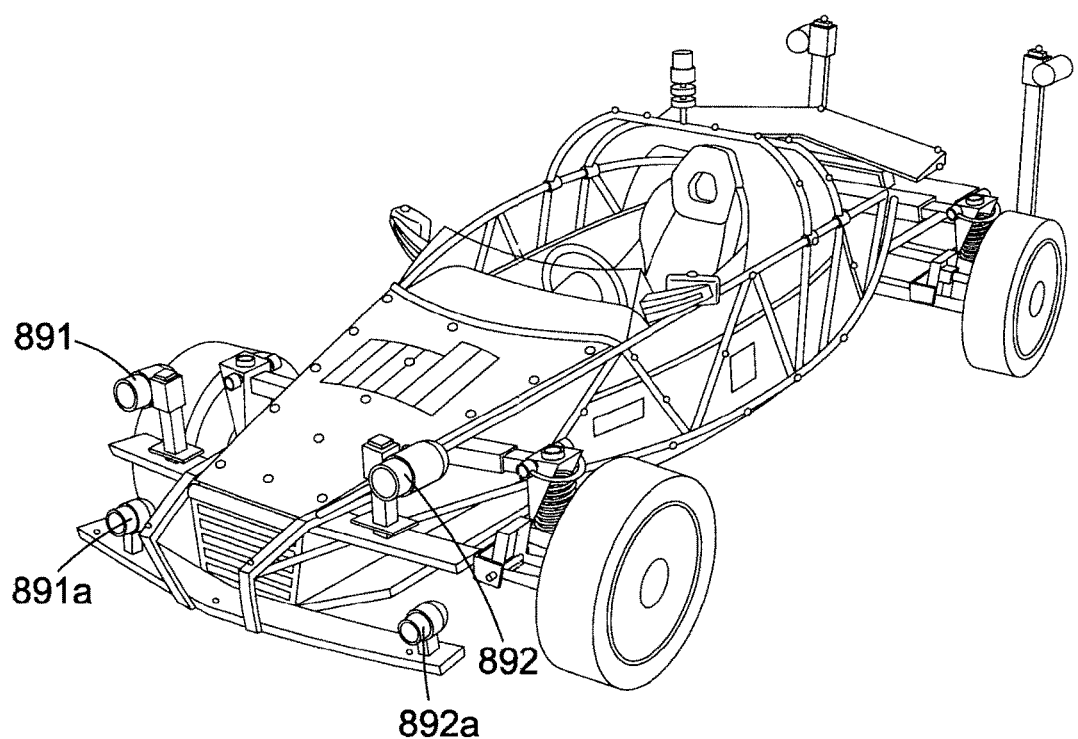
FIG. 8b depicts the front of the vehicle.

FIG. 8 depicts an arrangement via which the headlamps 891, 892, 891a and 892a can be adjustably attached to the frame. This is achieved in a similar manner as the adjustable rear headlamp assembly described above. The linear actuators are not shown. The component parts of the adjustable head lamp assembly could be fashioned using metal, carbon fibre or other resilient material. The headlamps can be typical and standard, and this disclosure will not go into further detail regarding the headlamps for this reason. FIG. 8b shows such a change in the position of the headlamps in relation to FIG. 1.

It will be appreciated that, for example, all-terrain vehicles, golf carts, skateboards, rough terrain vehicles may all benefit from an adjustable wheelbase, adjustable axle track, adjustable headlamps, and the other functionalities described herein.

It will be appreciated that the approaches described herein can be applied to any appropriate vehicle or driveable system, and for any appropriate implementation.

We claim:

1. A vehicle configured to be used in the field of motion tracking, comprising a frame and a plurality of wheels; the wheels being adjustably attached to the frame such that the distance between a pair of wheels can be adjusted, wherein said vehicle comprises a plurality of motion trackers arranged such that the relative position of motion trackers changes when the distance between a pair of wheels is adjusted.

2. The vehicle of claim 1, wherein the wheels are adjustably attached to the frame such that the distance between a pair of wheels can be continuously adjusted.

3. The vehicle of claim 1, configured to be driveable.

4. The vehicle of claim 1, wherein the frame is adjustable in at least one dimension to adjust wheel distance.

5. The vehicle of claim 1, comprising headlamps and/or rear light adjustably attached to the frame such that the distance between the wheels, the headlamps or the rear lights can be adjusted.

6. The vehicle of claim 1, comprising a steering system capable of steering the car at any one of the adjustable wheel distances.

7. The vehicle of claim 1, comprising a camera system.

8. The vehicle of claim 7, wherein the camera system is configured to take HDRI data.

9. A vehicle of claim 7, wherein the camera system is configured to capture images from the vehicle's surroundings, in which the camera system is arranged to capture simultaneously the full field of view available at the vehicle.

10. A method of applying digital effects to a vehicle comprising obtaining, at the vehicle, digital effects data comprising image data surrounding the vehicle, deriving reflection data therefrom and applying the reflections to the vehicle, wherein the vehicle is configured to be used in the field of motion tracking and comprises a frame and a plurality of wheels; the wheels being adjustably attached to the frame such that the distance between a pair of wheels can be adjusted, and wherein said vehicle further comprises a plurality of motion trackers arranged such that the relative position of motion trackers changes when the distance between a pair of wheels is adjusted.

11. The method of claim 10 in which the digital effects data is captured by a vehicle mounted camera.

12. A computer program product stored on a non-transitory computer readable medium and comprising program code instructions executable by a processor for implementing a method according to claim 10.

* * * * *